US012337375B2

(12) United States Patent
Kölm

(10) Patent No.: US 12,337,375 B2
(45) Date of Patent: Jun. 24, 2025

(54) RIVETING DEVICE COMPRISING A SPRING ELEMENT OF AN INTEGRATED THREADED SPINDLE

(71) Applicant: SFS Group Germany GmbH, Oberursel (DE)

(72) Inventor: Robert Kölm, Neu-Anspach (DE)

(73) Assignee: SFS Group Germany GmbH, Oberursel (DE)

(*) Notice: Subject to any disclaimer, the term of this patent is extended or adjusted under 35 U.S.C. 154(b) by 0 days.

(21) Appl. No.: 18/870,676

(22) PCT Filed: Jun. 29, 2023

(86) PCT No.: PCT/DE2023/100492

§ 371 (c)(1),
(2) Date: Dec. 1, 2024

(87) PCT Pub. No.: WO2024/002426

PCT Pub. Date: Jan. 4, 2024

(65) Prior Publication Data

US 2025/0170636 A1 May 29, 2025

(30) Foreign Application Priority Data

Jun. 30, 2022 (DE) ..................... 10 2022 116 413.6

(51) Int. Cl.
*B21J 15/04* (2006.01)
*B21J 15/10* (2006.01)
(Continued)

(52) U.S. Cl.
CPC ........... *B21J 15/043* (2013.01); *B21J 15/105* (2013.01); *B21J 15/26* (2013.01); *B25B 27/0014* (2013.01); *Y10T 29/5377* (2015.01)

(58) Field of Classification Search
CPC ........ B21J 15/043; B21J 15/10; B21J 15/105; B21J 15/26; B25B 27/0014; Y10T 29/5377
See application file for complete search history.

(56) References Cited

U.S. PATENT DOCUMENTS 2,789,619 A 4/1957 Wing et al.
3,254,522 A * 6/1966 Elliot ..................... B21J 15/105 29/243.525

(Continued)

FOREIGN PATENT DOCUMENTS

CN 201431990 Y 3/2010
CN 104999410 A 10/2015

(Continued)

*Primary Examiner* — Jared O Brown
(74) *Attorney, Agent, or Firm* — Smartpat PLC

(57) ABSTRACT

A riveting device has a riveting tool actuated by a drive. A mandrel holder can be moved relative to a mouthpiece along an operative axis. A spring element exerts a force into the mandrel holder. The drive has a threaded spindle with a front end facing towards the mandrel holder and an opposing back end. The spindle has a through hole which extends in the direction of its longitudinal extension. A back longitudinal section extends up to the back end of the threaded spindle. A front longitudinal section present before the back longitudinal section. A fixing structure created by a material recess non-displaceably connects the threaded spindle to the mandrel holder. The front longitudinal section of the through hole has a cross-sectional surface area which is smaller than the cross-sectional surface area of the back longitudinal section. The spring element is arranged in the back longitudinal section.

18 Claims, 3 Drawing Sheets

(51) Int. Cl.

| | |
|---|---|
| ***B21J 15/26*** | (2006.01) |
| ***B25B 27/00*** | (2006.01) |

(56) References Cited

U.S. PATENT DOCUMENTS

| | | | | | |
|---|---|---|---|---|---|
| 3,410,128 | A | | 11/1968 | Suater et al. | |
| 3,605,478 | A | | 9/1971 | Chirco | |
| 4,515,005 | A | * | 5/1985 | Klein | B21J 15/326 29/243.525 |
| 4,541,266 | A | | 9/1985 | Totsu | |
| 4,612,793 | A | | 9/1986 | Klein | |
| 5,473,805 | A | * | 12/1995 | Wille | B21J 15/326 29/243.526 |
| 5,511,298 | A | | 4/1996 | Gasser | |
| 5,598,619 | A | | 2/1997 | Rosier | |
| 5,605,070 | A | | 2/1997 | Wille | |
| 6,425,170 | B1 | | 7/2002 | Zirps et al. | |
| 7,032,281 | B1 | | 4/2006 | Lin | |
| D1,021,594 | S | | 4/2024 | Schönberner | |
| 2001/0020322 | A1 | | 9/2001 | Wille | |
| 2004/0112178 | A1 | | 6/2004 | Gilbert et al. | |
| 2015/0336159 | A1 | | 11/2015 | Gaertner et al. | |
| 2019/0283111 | A1 | | 9/2019 | Kawai et al. | |
| 2020/0130047 | A1 | | 4/2020 | Yabunaka et al. | |
| 2020/0139424 | A1 | | 5/2020 | Yabuguchi et al. | |
| 2021/0069773 | A1 | | 3/2021 | Yabunaka et al. | |
| 2021/0245236 | A1 | | 8/2021 | Ko | |
| 2021/0379646 | A1 | | 12/2021 | Killen | |
| 2021/0394253 | A1 | | 12/2021 | Yabunaka et al. | |
| 2022/0134412 | A1 | | 5/2022 | Teng et al. | |
| 2022/0355362 | A1 | | 11/2022 | Izutsu et al. | |

FOREIGN PATENT DOCUMENTS

| | | | |
|---|---|---|---|
| DE | 10011305 | A1 | 9/2001 |
| DE | 60212091 | T2 | 12/2006 |
| DE | 60214540 | T2 | 9/2007 |
| DE | 102016224555 | A1 | 6/2018 |
| DE | 102017215097 | A1 | 2/2019 |
| DE | 102020122949 | A1 | 3/2021 |
| DE | 102022110864 | A1 | 11/2022 |
| DE | 102022116406 | A1 | 1/2024 |
| DE | 102022116431 | A1 | 1/2024 |
| EP | 0116954 | A2 | 8/1984 |
| EP | 0527414 | A1 | 2/1993 |
| EP | 0593720 | A1 | 4/1994 |
| EP | 0670199 | A1 | 9/1995 |
| EP | 1132160 | A1 | 9/2001 |
| EP | 1525928 | A2 | 4/2005 |
| EP | 2910321 | A1 | 8/2015 |
| EP | 3643425 | A1 | 4/2020 |
| EP | 3957441 | A1 | 2/2022 |
| JP | S6127537 | A | 2/1986 |
| WO | 02098585 | A2 | 12/2002 |
| WO | 2015049738 | A1 | 4/2015 |
| WO | 2024002425 | A1 | 1/2024 |
| WO | 2024002427 | A1 | 1/2024 |
| WO | 2024002428 | A1 | 1/2024 |
| WO | 2024002429 | A1 | 1/2024 |
| WO | 2024002430 | A1 | 1/2024 |

* cited by examiner

RIVETING DEVICE COMPRISING A SPRING ELEMENT OF AN INTEGRATED THREADED SPINDLE

CROSS-REFERENCE TO RELATED APPLICATION

This application is a national stage application, filed under 35 U.S.C. § 371, of International Patent Application PCT/DE2023/100492, filed on Jun. 29, 2023, which claims the benefit of German Patent Application DE 10 2022 116 413.6, filed on Jun. 30, 2022.

TECHNICAL FIELD

The present disclosure refers to a riveting device with spring element integrated threaded spindle and in particular a blind rivet setting tool, a blind rivet nut setting tool and a blind rivet screw setting tool.

BACKGROUND

Riveting devices are typically used to produce a rivet connection between two or more materials, such as for example metal sheets, at a connection point at which the materials are placed on each other. To form the rivet connection, a plastically deformable, often cylindrical connecting element is used which is generally referred to as a rivet. The rivet usually has a rivet head prefabricated on one end. To produce the rivet connection, the rivet is introduced into a connection hole at the connection point up to the rivet head and then the other end of the rivet is plastically deformed to form a closing head.

Riveting devices can also be used to provide components with a thin wall with a thread. Rivet nuts or rivet screws are used for this, with which a rivet is combined with an element comprising a thread. The rivet nuts or rivet screws are introduced into a prefabricated rivet hole of the component and subsequently a region of the rivet is plastically deformed to form a closing head.

Commonly used riveting devices usually comprise a riveting tool which is set up to cause a plastic deformation forming the closing head. To actuate the riveting tool, the riveting devices have a drive device which is often electromechanical and, for example, comprises an electric motor and a spindle gear, formed as a ball screw drive. Such a riveting device is described in EP 0 670 199 A1 and is referred to therein as a setting device. The riveting device is designed for setting blind rivet nuts and set up to subject the blind rivet nut to a compression that produces a closing head by exerting a pull movement on a threaded rivet mandrel.

The riveting device often has a spring element, the force of which is used to press clamping jaws of a chuck housing against a rivet mandrel, received therein, for example of a blind rivet to be set and in this manner, to fix the rivet mandrel in the chuck housing. The chuck housing is a component of the riveting tool and is moved away from a mouthpiece by a threaded spindle driven by an electric motor during a riveting process, on which mouthpiece the setting head of the blind rivet is supported.

In some riveting devices, the threaded spindle is used for accommodating the spring element, in that the spring element is accommodated inside the threaded spindle and on the one hand is supported against the threaded spindle and on the other hand acts on the clamping jaws via a pressure part. Such riveting device is also described in EP 0 527 414 A1. There, the spring element is installed into the threaded spindle from the side facing towards the chuck housing and is located on a tubular extension of the pressure part which extends up to the back end of the threaded spindle. The threaded spindle itself has an external thread on its front end used for inserting the spring element, onto which external thread the chuck housing is screwed. The front end region of the threaded spindle thus has a lower wall thickness than other regions of the threaded spindle which lie in the force flow when the riveting tool is actuated. In this respect, a higher component load occurs precisely in this area during operation of the riveting device.

SUMMARY

In the course of continuous further development, there may be a need to improve the component durability of a riveting device of the aforementioned type.

An embodiment of a basic riveting device comprises a riveting tool and a drive device for actuating the riveting tool. For example, the riveting device, in particular the riveting tool, is suitable for blind riveting, during which, by means of a rivet mandrel, the riveting process is carried out from one side of the material to be provided with a blind rivet. A blind rivet nut or a blind rivet screw can also be used instead of a blind rivet.

Preferably, the riveting tool has a mouthpiece and a mandrel holder, which can be moved relative to the mouthpiece along or in the direction of an operative axis. Preferably, the riveting tool also has a spring element which exerts a force, for example, into the mandrel holder. In particular, the spring element exerts a force along the operative axis, i.e. axially. For example, the mandrel holder comprises a chuck housing that can be moved towards the mouthpiece along or in the direction of the operative axis and at least one clamping element, in particular clamping jaw, that can be moved in the chuck housing along a clamping path. For example, the spring element is set up to apply a force to the at least one clamping element forcing it inside the chuck housing.

Preferably, the drive device has a threaded spindle, preferably comprising a feed thread, which threaded spindle is operatively connected to the mandrel holder and in particular is set up to move along the operative axis. Preferably, the spring element is received in the threaded spindle, or the spring element is integrated in the threaded spindle. Compact construction of the riveting device, in particular axially relative to the operative axis, is favoured by such an internally placed spring element since the overall length can be reduced.

In particular, the threaded spindle has a front end facing towards the mandrel holder and an opposing back end. In particular, the threaded spindle is formed as a hollow spindle with a through hole extending in the direction of its longitudinal extent, for example to provide a mandrel removal path. In particular, the through hole has a back longitudinal section, extending to the back end of the threaded spindle, and a front longitudinal section in front of the back longitudinal section. In particular, in the region of the front end, the threaded spindle has a fixing structure, preferably created by a material recess, by means of which the threaded spindle is non-displaceably connected to the mandrel holder, for example directly or indirectly via an intermediate element.

An improvement in component durability is provided by an embodiment of the riveting device in which the front longitudinal section of the through hole of the threaded spindle has a cross-sectional surface area that is smaller than the cross-sectional surface area of the back longitudinal section. Any component weakening of the threaded spindle is counteracted by the through hole formed in this manner.

Additionally, the dimensions of the larger cross-sectional surface area of the through hole in the back longitudinal section ensures that there is sufficient installation space for receiving the spring element. A further embodiment therefore provides that the spring element is arranged in the back longitudinal section of the through hole of the threaded spindle. Because the back longitudinal section extends up to the back end of the threaded spindle, simple is simple, since the spring element can be introduced via the back end of the threaded spindle into the through hole.

In order to allow the force of the spring element to act in the direction of the mandrel holder, according to a further embodiment, the spring element is supported on the back of the threaded spindle, in particular directly or via a counter holder, in the direction of the operative axis in the region of the back longitudinal section. If a counter holder is provided, the counter holder is screwed into the through hole at the back end of the threaded spindle, for example.

The improved riveting device can be procured so that the front longitudinal section of the through hole extends to the front end of the threaded spindle. Any component weakening of the threaded spindle in the region of its front end, in which for example the fixing structure is located for connecting the mandrel holder, is counteracted by the through hole formed in this manner.

The fixing structure of the threaded spindle can comprise or be a thread, in particular an external thread. Due to the smaller cross-sectional surface area of the through hole in the region of the front end of the threaded spindle, i.e. in the region of the present fixing structure, any possible component weakening caused by the thread is particularly counteracted.

The improved riveting device can also be created so that the front longitudinal section of the through hole and the feed thread of the threaded spindle overlap each other in an overlapping section. Thus, in the overlapping region, the through hole has the smaller cross-sectional surface area. Therefore, an improvement of the component durability is also achieved.

In one embodiment, the threaded spindle is engaged with a spindle nut of a spindle gear, which is a component of the drive device, for example. In this case, the improved riveting device can be created so that in an initial state, present before actuating the riveting tool, the spring element is arranged axially in the threaded spindle in such a way that the spindle nut and the spring element overlap or an end of the spindle nut facing towards the riveting tool is in front of an end of the spring element facing towards the riveting tool. Therefore, a compact construction in the axial direction in relation to the operative axis is favoured.

In a further embodiment, a pressure part is received displaceably in the front longitudinal section of the through hole of the threaded spindle for transmitting the force of the spring element. The improved riveting device can in this case be created so that the pressure part is formed as a hollow body having a through hole extending in the direction of its longitudinal extent, the diameter of which through hole is greater than the diameter of a rivet mandrel which can be or is used by the riveting tool. Therefore, any rivet mandrel remnants remaining from a riveting process can be removed from the riveting tool via the through hole of the pressure part.

In a further embodiment, the spring element has a through hole extending in the direction of the longitudinal axis of the threaded spindle, the diameter of which though hole is greater than the diameter of a rivet mandrel which can be or is used by the riveting tool. For this purpose, it is useful if the spring element is formed as a compression spring. This measure also aims to remove any rivet mandrel remnants remaining from a riveting process from the riveting tool.

In the same vein, the measure provides that, according to a further embodiment, the above-described counter holder has a through hole extending in the direction of the longitudinal axis of the threaded spindle, the diameter of which through hole is greater than the diameter of a rivet mandrel which can be or is used by the riveting tool. Thus, a mandrel removal path can be realised by the through hole of the threaded spindle and/or the through hole of the pressure part and/or the through hole of the counter holder.

For example, the diameter of the through hole of the spring element and/or the diameter of the through hole of the counter holder is so large that an intermediate sleeve or an intermediate tube can be introduced into the through hole of the spring element or the counter holder, and the inner diameter of the intermediate sleeve or the intermediate tube, for example, is greater than the diameter of the rivet mandrel that can be used by the riveting tool. The intermediate sleeve or the intermediate tube can be provided in order to keep the cross-section of the mandrel removal path consistent over its preferably entire length and/or in order to adjust the cross-section of the mandrel removal path to a specific used mandrel diameter of the used rivet mandrel.

In a further embodiment, the threaded spindle is a component of an electromechanical drive device which comprises an electric motor for driving the threaded spindle. For example, the threaded spindle is a ball threaded spindle and, for example, is a component of a ball screw drive.

In a further embodiment, the riveting device is formed as a hand riveting device and comprises a handle part which, for example, has a longitudinal extension transverse to the operative axis. For example, the handle part is formed on a device housing receiving the drive device, in particular receiving the threaded spindle, in particular moulded thereon. The riveting device can be held in the hand or manually guided by the handle part. In particular, the handle part allows the riveting device to be positioned manually at a point to be riveted.

According to one aspect, a blind rivet setting tool is proposed. The blind rivet setting tool comprises the above-described riveting device and has a rivet mandrel received in its mandrel holder of a blind rivet to be set.

According to a further aspect, a blind rivet nut setting tool is proposed. The blind rivet nut setting tool comprises the above-described riveting device and has a threaded rivet mandrel received in its mandrel holder for a blind rivet nut to be set.

According to a further aspect, a blind rivet screw setting tool is proposed. The blind rivet screw setting tool comprises the above-described riveting device and has a threaded rivet mandrel received in its mandrel holder of a blind rivet screw to be set.

BRIEF DESCRIPTION OF THE DRAWINGS

Further characteristics and features result from the following description of several exemplary embodiments with reference to the drawing, which shows.

DETAILED DESCRIPTION

Figure 1:
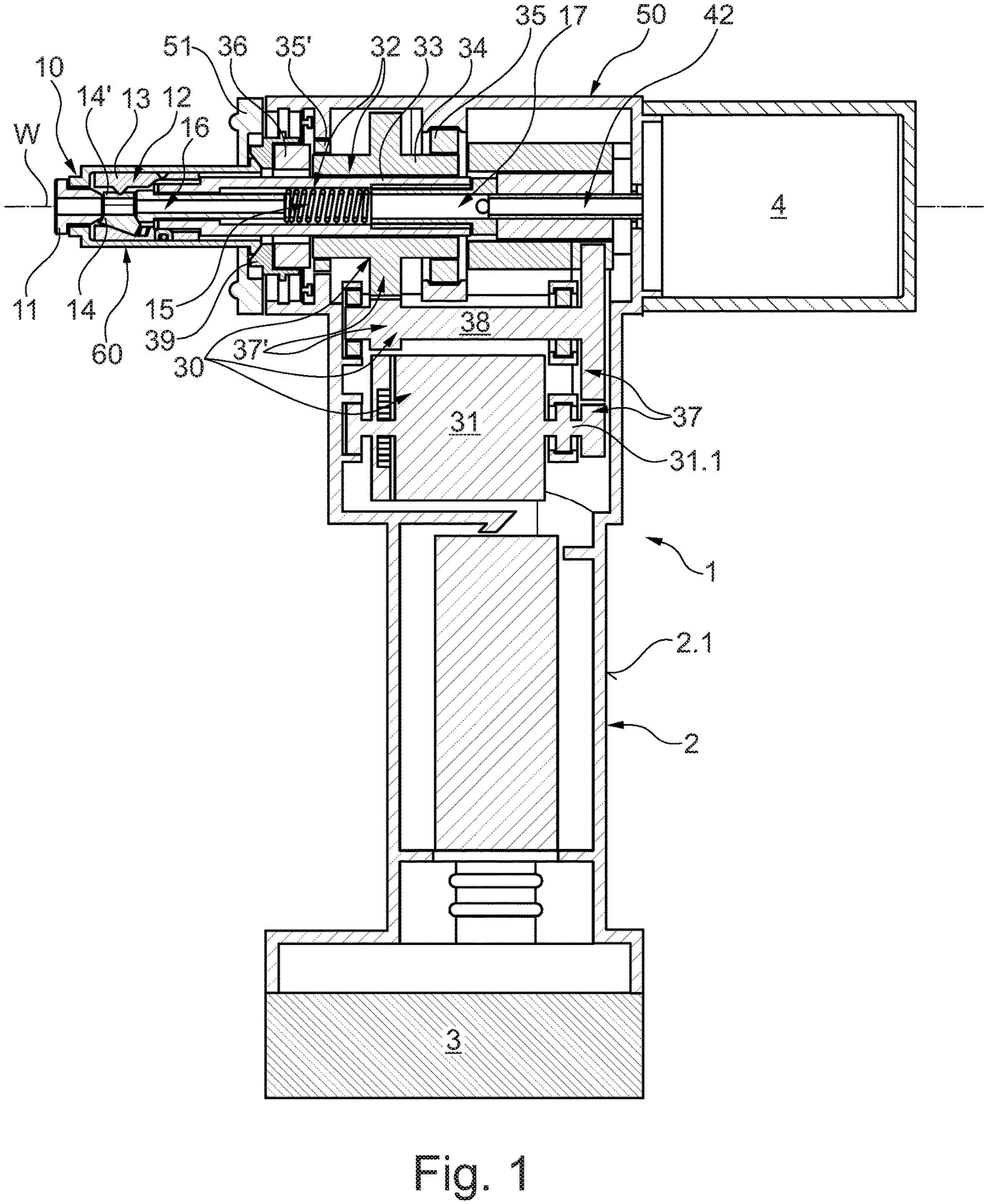
FIG. 1 an exemplary embodiment of a riveting device having a riveting tool and a drive device for actuating the riveting tool in a schematic sectional representation, FIG. 2 an enlarged section of the riveting device of FIG. 1 in the region of the riveting tool and a spindle gear operatively connected to it in a schematic sectional representation, FIG. 3 a possible embodiment of a blind rivet setting tool having the exemplary riveting device of FIG. 1 in a schematic partial representation, FIG. 4 a possible embodiment of a blind rivet nut setting tool having the exemplary riveting device of FIG. 1 in a schematic partial representation, and FIG. 5 a possible embodiment of a blind rivet screw setting tool having the exemplary riveting device of FIG. 1 in a schematic partial representation.

FIG. 1 shows the construction of an exemplary embodiment of a riveting device 1 which is also referred to as a setting device by experts. The exemplary riveting device 1 is suitable for applying rivets according to the blind riveting method, and in this regard is designed for using blind rivets.

The exemplary riveting device 1 comprises a riveting tool 10 and a drive device 30 for actuating the riveting tool 10. Preferably, the riveting tool 10 is received in a tool housing 60. Preferably, the drive device 30 is received in a device housing 50. Preferably, the tool housing 60 is a metal housing. Preferably, the device housing 50 is a plastic housing.

Preferably, the drive device 30 is an electromechanical drive device. The electromechanical drive device 30 comprises for example an electric motor 31 having a rotatable output shaft 31.1 and preferably a spindle gear 32, which can be driven by the electric motor 31. Preferably, the spindle gear 32 is set up to convert a rotational drive movement coming from the output shaft 31.1 into a translational drive movement which acts along an operative axis W to actuate the riveting tool 10. The spindle gear 32 can be a ball screw drive.

Figure 2:
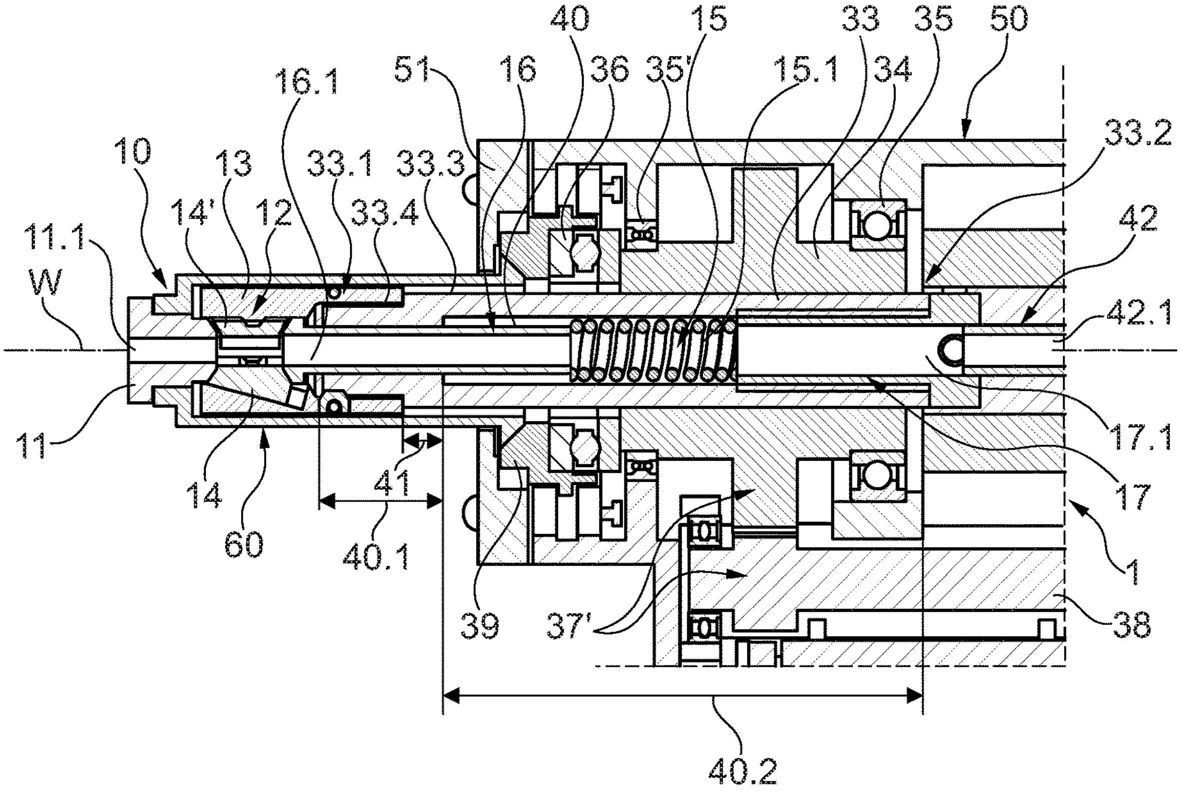

FIG. 2 shows an enlarged section of the exemplary riveting device 1 in the region of the riveting tool 10 and of the spindle gear 32. As can be seen in particular, the riveting tool 10 can comprise a mouthpiece 11, and a mandrel holder 12, which can be moved relative to the mouthpiece 11 in the direction of an operative axis W. For example, the mandrel holder 12 has a chuck housing 13 and at least one, preferably more clamping elements 14, 14', in particular clamping jaws, which can be moved in the chuck housing 13 along a clamping path. Preferably, the mouthpiece 11 and/or the mandrel holder 12 and/or the chuck housing 13 and/or the clamping elements 14, 14' are a metal part.

The mouthpiece 11 is used, for example, to receive a rivet, in particular a blind rivet (not shown in FIGS. 1 and 2) to be set and preferably has a through hole 11.1 in order to insert the rivet mandrel of the rivet therein. The mandrel holder 12 serves, for example, to fix the rivet mandrel, so that a non-displaceable connection between the received rivet mandrel and the mandrel holder 12 is created. This can take place, for example, via the chuck housing 13 with the clamping elements 14, 14' arranged movably therein, by means of which the rivet mandrel is fixed in the chuck housing 13, in particular is clamped.

Preferably, a spring element 15 is provided which exerts a force into the mandrel holder 12. The force of the spring element 15 can be used as a pretension force which causes or at least supports the fixing of the rivet mandrel in the mandrel holder 12. For example, the spring element 15 is provided in order to exert a spring force to the clamping elements 14, 14' inside the chuck housing 13. Therefore, the clamping elements 14, 14' are pushed into a clamping position against a rivet mandrel, for example of a blind rivet, introduced via the through hole 11.1 of the mouthpiece 11 into the chuck housing 13. For example, the spring element 15 is a compression spring.

The riveting tool 10 can be actuated by the drive device 30 so that the mandrel holder 12 or the chuck housing 13 together with the rivet mandrel received therein is moved away from the mouthpiece 11 in the direction of the operative axis W. This happens, for example, by the drive device 30 pulling the mandrel holder 12 or the chuck housing 13 away from the mouthpiece 11. This mode of operation, which is known per se, and the blind riveting which can be carried out with it is described in more detail in the publication EP 0 116 954 A2, to which reference is hereby made for the purpose of completing and supplementing the present disclosure, with the note that the publication may attach a meaning to identically worded terms which differs from the present meaning.

Preferably, the mouthpiece 11 is fixed to the tool housing 60, for example screwed to it. Preferably, the mandrel holder 12, in particular the chuck housing 13, is received in the tool housing 60 so as to be movable in the direction of the operative axis W. For example, the tool housing 60 is tubular. For example, the mouthpiece 11 is fixed on one end of the tool housing 60 and the opposing end faces towards the device housing 50.

Preferably, the spindle gear 32 is arranged in the device housing 50. Preferably, the spindle gear 32 comprises a threaded spindle 33 having a feed thread 33.3 and a spindle nut 34 that is or can be engaged with the latter. Preferably, the threaded spindle 33 and the spindle nut 34 are arranged concentrically to each other with regard to a transmission axis, in particular the transmission axis of the spindle gear 32. Preferably, the output shaft 31.1 of the electric motor 31 is arranged axially parallel to the transmission axis. Preferably, the transmission axis is on the operative axis W.

For example, the threaded spindle 33 and the spindle nut 34 are set up in such a way that the spindle nut 34 is the gear element that is or can be driven by the electric motor 31 and the threaded spindle 33 is used for performing the translational drive movement in order to actuate the riveting tool 10. For example, the spindle nut 34 is mounted rotatably in the device housing 50 and the threaded spindle 33 is secured against rotation relative to the device housing 50.

For example, the spindle nut 34 is rotatably mounted in the radial direction relative to the transmission axis or the operative axis W via at least one, preferably two radial bearing 35, 35' in the device housing 50. For example, the radial bearings 35, 35' are arranged at an axial distance from each other. For example, a drive point is located between the radial bearings 35, 35', by means of which the electric motor 31 is operatively connected to the spindle nut 34. For example, the radial bearings 35, 35' are roller bearings, in particular deep groove ball bearings.

For example, the spindle nut 34 is mounted axially with respect to the transmission axis or the operative axis W via an axial bearing 36 in a support ring 39, for example serving as a bearing housing, wherein the support ring 39 is supported on the mouthpiece 11 in the axial direction via the tool housing 60. The tool housing 60 itself is held on the support ring 39, in particular held loosely, via a retaining structure 51, such as for example a ring-shaped cover element.

Preferably, the support ring 39 is designed to be resistant to deformation and pressure-resistant. For example, the support ring 39 is a metal part. For example, the support ring 39 is a separate component. For example, the axial bearing 36 is an axial roller bearing. In principle, the axial bearing 36 can also be a needle bearing.

As can be seen clearly for example from FIG. 1, at least one, preferably two reduction stages 37, 37' can be interposed between the electric motor 31 and the spindle gear 32. For example, the reduction gears 37, 37' are connected in series in the force flow. For example, the reduction gears 37, 37' use a common intermediate shaft 38. For example, at least one of the reduction stages 37, 37' is a spur gear stage and the associated gear elements are spur gears. Similarly, the device housing 50 can be used for radially mounting the reduction gears 37, 37'. The device housing 50 can also be used for radially mounting the electric motor 31.

In relation to the mounting of the spindle gear 32, in particular the spindle nut 34, to the mounting of the reduction stages 37, 37', in particular the common intermediate shaft 38, and to the mounting of the electric motor 31, reference is made, for the purpose of the completion and expansion of the present disclosure, to the German patent application with the official file number DE 10 2022 116 406.3, with the note that the patent application may attribute a meaning to identical terms which differs from the present meaning.

In particular, as can be seen from FIG. 2, the threaded spindle 33 has a front end 33.1, facing towards the mandrel holder 12, in particular the chuck housing 13, and an opposing back end 33.2. Preferably, the threaded spindle 33 has a fixing structure 33,4 in the region of its front end 33.1, by means of which the threaded spindle 33 is non-displaceably connected directly or indirectly to the mandrel holder 12, in particular the chuck housing 13. For example, the fixing structure 33.4 is created by a material recess or some other reworking or finishing of the threaded spindle 33. For example, the fixing structure 33.4 is a thread, in particular an external thread.

Preferably, the threaded spindle 33 is formed as a hollow spindle with a through hole 40 extending in the direction of its longitudinal extension. The through hole 40 makes it possible to remove any rivet mandrel remnants remaining from a riveting process from the riveting tool 10. For example, the through hole 40 on the back end 33.2 of the threaded spindle 33 leads into a removal sleeve 42, which again leads into a collection container 4 (FIG. 1). For example, the removal sleeve 42 is connected integrally to the device housing 50. For example, the removal sleeve 42 is plugged with one end into the through hole 40 of the threaded spindle 33, in particular on the back end 33.2. For example, in this manner a mandrel removal path is realised via the threaded spindle 33, whereby the collection container 4 serves as a collector for mandrel remnants.

Preferably, therefore the through hole 40 of the threaded spindle 33 has a diameter which is greater than the diameter of a rivet mandrel that can be or is used by the riveting tool 10. In order to be as compact as possible in the radial direction with respect to the operative axis W, the diameter of the through hole 40 of the threaded spindle 33 is preferably only slightly greater than the diameter of the rivet mandrel, so that there is no risk of the rivet mandrel getting jammed or stuck in the through hole 40 of the threaded spindle 33.

The through hole 40 is further used in the exemplary riveting device 1 in order to accommodate the spring element 15. For example, the spring element 15 is arranged completely in the threaded spindle 33, in particular in the through hole 40. Therefore, the compactness of the riveting device 1 is improved, for example in comparison to an embodiment having a spring element on the outside of a threaded spindle. In this respect, the overall length can be reduced by the internally placed spring element 15.

In order to accommodate the spring element 15 in the through hole 40 of the threaded spindle 33, it is provided, for example, that the through hole 40 has a back longitudinal section 40.2 extending up to the back end 33.2 of the threaded spindle 33 and a front longitudinal section 40.1 present before the back longitudinal section, and that the front longitudinal section 40.1 has a cross-sectional surface area which is smaller in comparison to the cross-sectional surface area of the back longitudinal section 40.2. The cross-sectional surface area of the back longitudinal section 40.2 is therefore greater than the cross-sectional surface area of the front longitudinal section 40.1.

This design of the through hole 40 is, for example, specifically selected in order, firstly, to accommodate the greater radial extension of the spring element 15 compared to the radial extension of a rivet mandrel. Therefore, the cross-sectional surface area of the one longitudinal section 40.2 of the through hole 40 is greater than the cross-sectional surface area of the other longitudinal section 40.1 and preferably therefore the spring element 15 is arranged in the longitudinal section 40.2 having the greater cross-sectional surface area. Secondly, the longitudinal section having the greater cross-sectional surface area is the back longitudinal section 40.2 of the through hole 40. This longitudinal section is not additionally weakened by the fixing structure 33.4, in particular the fixing thread and, for example, an associated under cut, in comparison to the front longitudinal section 40.1.

Preferably, the front longitudinal section 40.1 of the through hole 40 extends up to the front end 33.1 of the threaded spindle 33. In this manner, any component weakening of the threaded spindle 33 is counteracted in the region of the fixing structure 33.4. For example, the front longitudinal section 40.1 of the through hole 40 extends so far in the direction of the back end 33.2 of the threaded spindle 33 that the front longitudinal section 40.1 and the feed thread 33.3 of the threaded spindle 33 overlap each other in an overlapping section 41.

For example, in an initial state, present before actuating the riveting tool 10, the spring element 15 is arranged axially in the threaded spindle 33 in such a way that the spindle nut 34 and the spring element 15 overlap or an end of the spindle nut 34 facing towards the riveting tool 10 is in front of an end of the spring element 15 facing towards the riveting tool 10. To transmit the force of the spring element 15 in the direction of the mandrel holder 12, a pressure part 16 is provided, for example. For example, the pressure part 16 is at least partially displaceably received in the front longitudinal section 40.1 of the through hole 40. For example, the spring element 15 is supported with its back end on the threaded spindle 33. This takes place in the exemplary riveting device 1, for example, via a counter holder 17. The counter holder 17 is fixed on the threaded spindle 33, for example, in particular screwed onto the back end 33.2 of the threaded spindle 33, for example screwed into the through hole 40 of the threaded spindle 33.

Preferably, the spring element 15 has a through hole 15.1, extending in the direction of the longitudinal axis of the threaded spindle 33, the diameter of which through hole is greater than the diameter of a rivet mandrel which can be used by the riveting tool 10. Preferably, the pressure part 16 is formed as a preferably elongate hollow body having a through hole 16.1 extending in the direction of its longitudinal extension, the diameter of which through hole is greater than the diameter of a rivet mandrel which can be used by the riveting tool 10. Preferably, the counter holder 17 is formed as a preferably elongate hollow body having a through hole 17.1 extending in the direction of its longitudinal extension, the diameter of which through hole is greater than the diameter of a rivet mandrel which can be used by the riveting tool 10. In this manner, it is possible to realise a mandrel removal path, in the case of which the collection container 4 can be used as a collector for mandrel remnants.

For example, the diameter of the through hole 15.1 of the spring element 15 and/or the diameter of the through hole 17.1 of the counter holder 17 is so large that an intermediate sleeve or an intermediate tube (not shown in FIGS. 1 and 2) can be introduced into the through hole 15.1 of the spring element 15 or into the through hole 17.1 of the counter holder 17, and the inner diameter of the intermediate sleeve or the intermediate tube is, for example, greater than the diameter of the rivet mandrel that can be used by the exemplary riveting tool. The intermediate sleeve or the intermediate tube can be provided in order to keep the cross-section of the mandrel removal path consistent over its preferably entire length and/or in order to adjust the cross-section of the mandrel removal path to a specific used mandrel diameter of the used rivet mandrel.

The riveting device 1 can be a hand riveting device. The hand riveting device 1 has a gripping surface 2.1, for example, which can be formed at least partially on the device housing 50. For example, the hand riveting device 1 has a handle part 2 which is at least partially formed by the device housing 50. The riveting device 1 can be held in the hand by the gripping surface 2.1 or the handle part 2 when it is positioned on a workpiece for setting a blind rivet. The riveting process takes place then by actuating the riveting tool 10 via the drive device 30.

A preferably replaceable electrical energy storage device, such as an accumulator 3, can be provided for the electrical energy supply of the drive device 30, which energy storage device is arranged, for example, in the region of an end of the handle part 2 facing away from the riveting tool 10. Therefore, the riveting device 1 can be a cordless tool.

Figure 3:
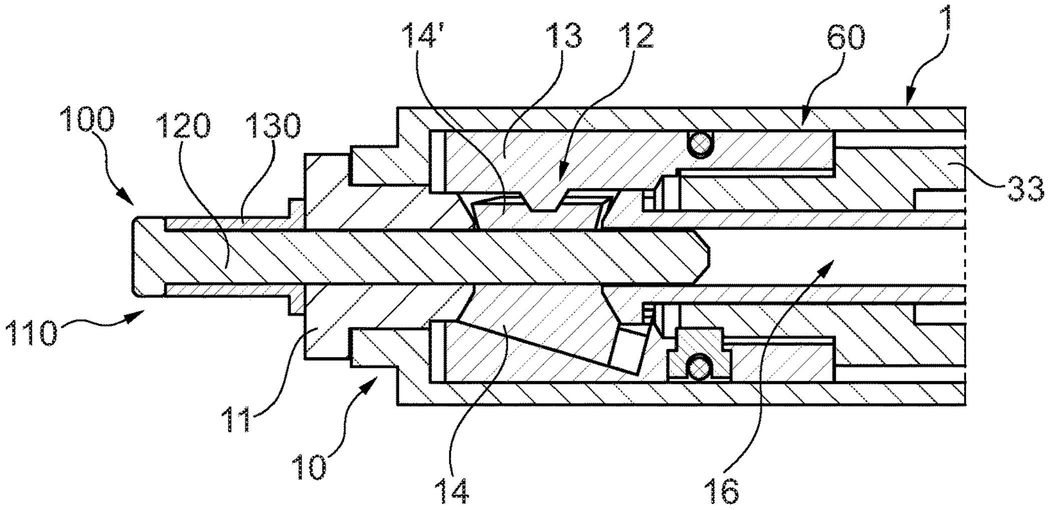

FIG. 3 shows an example of a possible embodiment of a blind rivet setting tool 100. The blind rivet setting tool 100 has the construction of the above-described exemplary riveting device 1, with only a section of the exemplary riveting device 1 being shown in the region of the riveting tool 10 in FIG. 3 for simplicity. In the blind rivet setting tool 100, a rivet mandrel 120 of a blind rivet 110 is introduced into the mouthpiece 11 and received in the mandrel holder 12, in particular the chuck housing 13, and fixed in the axial direction, for example by the at least one clamping element 14 or 14'. For example, this is caused by the spring element 15 of the riveting device 1 (FIG. 2) which exerts its spring force via the pressure part 16 onto the at least one clamping element 14 or 14', whereby the at least one clamping element 14 or 14' is held against the rivet mandrel 120 in the clamping position. FIG. 3 shows the blind rivet 110 in the state before riveting, in which the rivet body 130 of the blind rivet 110 is still in its initial state.

Figure 4:
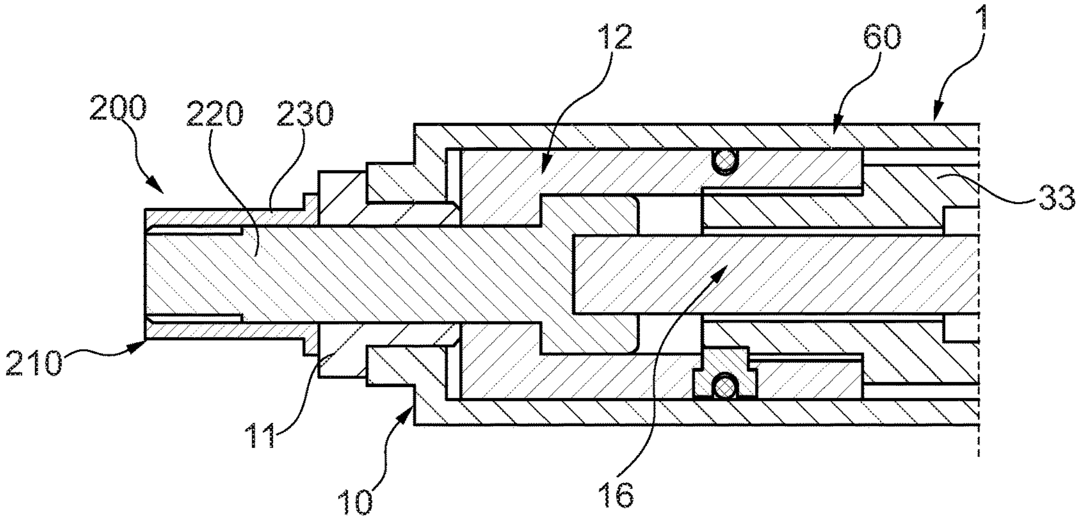

FIG. 4 shows an example of a possible embodiment of a blind rivet nut setting tool 200. The blind rivet nut setting tool 200 has the construction of the above-described exemplary riveting device 1, wherein the mandrel holder 12 and the pressure part 16 are modified with regard to a rivet mandrel for a blind rivet nut and the rivet mandrel is a threaded rivet mandrel. For example, the pressure part 16 has a function there with regard to threading the threaded rivet mandrel into the blind rivet nut. In FIG. 4, only a section of the riveting device 1 is shown in the region of the riveting tool 10 for simplicity. With the blind rivet nut setting tool 200, a threaded rivet mandrel 220 for a blind rivet nut 210 is received in the mandrel holder 12. FIG. 4 shows the blind rivet nut 210 in the state before riveting, in which the rivet body 230 of the blind rivet nut 210 is still in its initial state.

For example, with the exemplary blind rivet nut setting tool 200, the pressure part 16 is introduced into a receptacle of the threaded rivet mandrel 220 and forms a positive-locking rotationally-fixed connection to the threaded rivet mandrel 220 via the receptacle. For example, the pressure part 16 is held in the receptacle of the threaded rivet mandrel 220 by the force of the spring element 15 of the riveting device 1 (FIG. 2), which acts axially on the pressure part 16.

Figure 5:
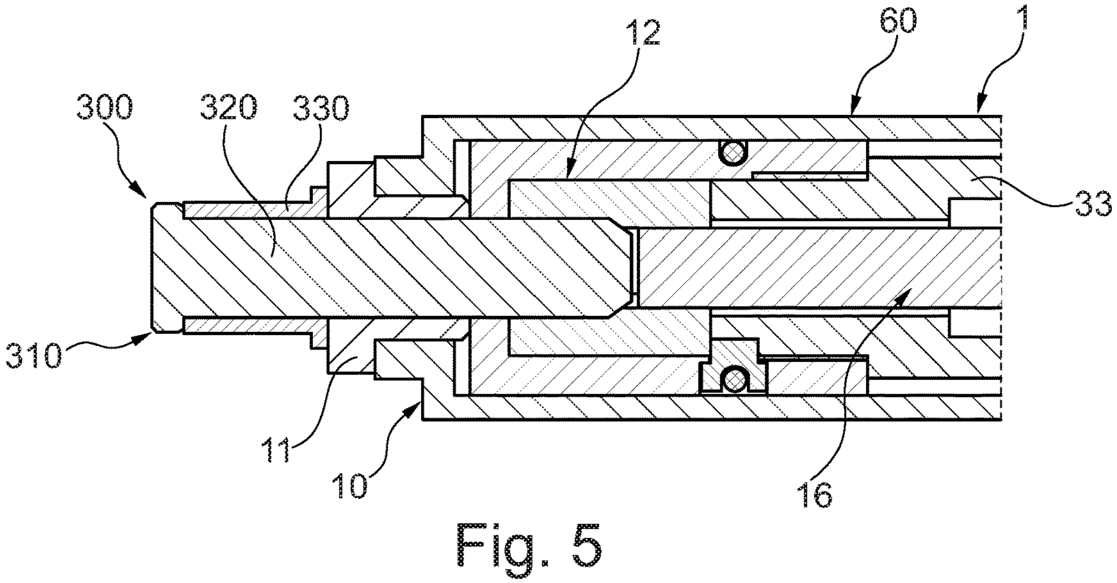

FIG. 5 shows an example of a possible embodiment of a blind rivet screw setting tool 300. The blind rivet screw setting tool 300 has the construction of the above-described riveting device 1, wherein the mandrel holder 12 and the pressure part 16 are modified with regard to a rivet mandrel of a blind rivet screw and the rivet mandrel is a threaded rivet mandrel. For example, the pressure part 16 has a function there with regard to threading the threaded rivet mandrel into a screw-in part of the mandrel holder 12. In FIG. 5, only a section of the riveting device 1 is shown in the region of the riveting tool 10 for simplicity. With the blind rivet screw setting tool 300, a threaded rivet mandrel 320 of a blind rivet screw 310 is received in the mandrel holder 12 via the screw-in part. FIG. 5 shows the blind rivet screw 310 in the state before riveting, in which the rivet body 330 of the blind rivet screw 310 is still in its initial state.

For example, with the exemplary blind rivet screw setting tool 300, the pressure part 16 acts on the screw-in part, in particular the pressure part 16 is introduced into a receptacle of the screw-in part and forms a positive-locking rotationally-fixed connection to the screw-in part via the receptacle. For example, the pressure part 16 is held in the receptacle of the screw-in part by the force of the spring element 15 of the riveting device 1 (FIG. 2), which acts axially on the pressure part 16.

REFERENCE NUMERAL LIST

1 riveting device
2 handle part
2.1 gripping surface
3 accumulator
4 collection container
10 riveting tool
11 mouthpiece
11.1 through hole
12 mandrel holder
13 chuck housing
14 clamping element
14 clamping element
15 spring element
15.1 through hole
16 pressure part
16.1 through hole
17 counter holder
17.1 through hole
30 drive device
31 electric motor
31.1 output shaft
32 spindle gear

33 threaded spindle
33.1 front end
33.2 back end
33.3 feed thread
33.4 fixing structure
34 spindle nut
35 radial bearing
35' radial bearing
36 axial bearing
37 reduction stage
37' reduction stage
38 intermediate shaft
39 support ring
40 through hole
40.1 front longitudinal section
40.2 back longitudinal section
41 overlapping section
42 removal sleeve
42.1 through hole
50 device housing
51 retaining structure
60 tool housing
100 blind rivet setting tool
110 blind rivet
120 rivet mandrel
200 blind rivet nut setting tool
210 blind rivet nut
220 threaded rivet mandrel
300 blind rivet screw setting tool
310 blind rivet screw
320 threaded rivet mandrel
W operative axis

The invention claimed is:

1. A riveting device (1), comprising:
a riveting tool (10), having
a mouthpiece (11),
a mandrel holder (12) that can be moved relative to the mouthpiece (11) along an operative axis (W), and
a spring element (15) which exerts a force into the mandrel holder (12); and
a drive device (30) for actuating the riveting tool (10) with a threaded spindle (33) having a feed thread (33.3),
wherein the threaded spindle (33) receives the spring element (15),
wherein the threaded spindle (33) is operatively connected to the mandrel holder (12) and configured to be moved along the operative axis (W),
wherein the threaded spindle (33) has a front end (33.1) facing towards the mandrel holder (12) and an opposing back end (33.2),
wherein the threaded spindle (33) is formed as a hollow spindle having a through hole (40),
wherein the through hole (40) extends in a direction of a longitudinal extension of the threaded spindle (33),
wherein the through hole (40) has a back longitudinal section (40.2) extending up to the opposing back end (33.2) of the threaded spindle (33) and a front longitudinal section (40.1) present in front of the back longitudinal section,
wherein the threaded spindle (33) has a fixing structure (33.4) created by a material recess in a region of the front end (33.1),
wherein the fixing structure (33.4) connects the threaded spindle (33) directly or indirectly to the mandrel holder (12),
wherein the front longitudinal section (40.1) of the through hole (40) has a cross-sectional surface area which is smaller than a cross-sectional surface area of the back longitudinal section (40.2),
wherein the spring element (15) is arranged in the back longitudinal section (40.2);
wherein the front longitudinal section (40.1) of the through hole (40) and the feed thread (33.3) of the threaded spindle (33) overlap each other in an overlapping section (41).

2. The riveting device according to claim 1,
wherein the spring element (15) is supported in a region of the back longitudinal section (40.2) in a direction of the operative axis (W) on the threaded spindle (33) directly or via a counter holder (17).

3. The riveting device according to claim 1,
wherein the front longitudinal section (40.1) of the through hole (40) extends to the front end (33.1) of the threaded spindle (33).

4. The riveting device according to claim 1,
wherein the fixing structure (33.4) of the threaded spindle (33) comprises an external thread or is an external thread.

5. The riveting device according to claim 1,
wherein the threaded spindle (33) is engaged into a spindle nut (34) of a spindle gear (32) and in an initial state, present before actuating the riveting tool (10), the spring element (15) is arranged axially in the threaded spindle (33) in such a way that the spindle nut (34) and the spring element (15) overlap or an end of the spindle nut (34) facing towards the riveting tool (10) is in front of an end of the spring element (15) facing towards the riveting tool (10).

6. The riveting device according to claim 1,
wherein a pressure part (16) is received displaceably in the front longitudinal section (40.1) of the through hole (40) for transmitting the force of the spring element (15),
wherein the pressure part (16) is formed as a hollow body having a through hole (16.1) extending in a direction of a longitudinal extension of the pressure part, a diameter of the through hole of the hollow body is greater than a diameter of a rivet mandrel that can be used by the riveting tool (10).

7. The riveting device according to claim 1,
wherein the spring element (15) has a through hole (15.1) extending in a direction of a longitudinal axis of the threaded spindle (33),
wherein a diameter of the through hole (15.1) of the spring element (15) is greater than a diameter of a rivet mandrel that can be used by the riveting tool (10).

8. The riveting device according to claim 1,
wherein the spring element (15) is a compression spring.

9. The riveting device according to claim 1,
wherein the threaded spindle (33) is a ball threaded spindle.

10. The riveting device according to claim 1,
wherein the drive device (30) is an electromechanical drive device (30), and
wherein the electromechanical drive device (30) comprises an electric motor (31) for driving the threaded spindle (33).

11. The riveting device according to claim 1,
wherein the riveting device (1) is a hand riveting device with a handle part (2).

12. A blind rivet setting system (100), comprising:
the riveting device (1) according to claim 1; and
a rivet mandrel (120) of a blind rivet (110) to be set, wherein the rivet mandrel is received in the mandrel holder (12) of the riveting device (1).

13. A blind rivet nut setting system (200), comprising:

a riveting device (1) according to claim 1; and a threaded rivet mandrel (220) for a blind rivet nut (210) to be set, wherein the threaded rivet mandrel is received in the mandrel holder (12) of the riveting device (1).

14. A blind rivet screw setting system (300), comprising:

a riveting device (1) according to claim 1; and a threaded rivet mandrel (320) of a blind rivet screw (310) to be set, wherein the threaded rivet mandrel is received in the mandrel holder (12) of the riveting device (1).

15. A riveting device (1), comprising:

a riveting tool (10), having a mouthpiece (11), a mandrel holder (12) that can be moved relative to the mouthpiece (11) along an operative axis (W), and a spring element (15) which exerts a force into the mandrel holder (12); and a drive device (30) for actuating the riveting tool (10) with a threaded spindle (33) having a feed thread (33.3), wherein the threaded spindle (33) receives the spring element (15), wherein the threaded spindle (33) is operatively connected to the mandrel holder (12) and configured to be moved along the operative axis (W), wherein the threaded spindle (33) has a front end (33.1) facing towards the mandrel holder (12) and an opposing back end (33.2), wherein the threaded spindle (33) is formed as a hollow spindle having a through hole (40), wherein the through hole (40) extends in a direction of a longitudinal extension of the threaded spindle (33), wherein the through hole (40) has a back longitudinal section (40.2) extending up to the opposing back end (33.2) of the threaded spindle (33) and a front longitudinal section (40.1) present in front of the back longitudinal section, wherein the threaded spindle (33) has a fixing structure (33.4) created by a material recess in a region of the front end (33.1), wherein the fixing structure (33.4) connects the threaded spindle (33) directly or indirectly to the mandrel holder (12), wherein the front longitudinal section (40.1) of the through hole (40) has a cross-sectional surface area which is smaller than a cross-sectional surface area of the back longitudinal section (40.2), wherein the spring element (15) is arranged in the back longitudinal section (40.2), wherein the threaded spindle (33) is engaged into a spindle nut (34) of a spindle gear (32) and in an initial state, present before actuating the riveting tool (10), the spring element (15) is arranged axially in the threaded spindle (33) in such a way that the spindle nut (34) and the spring element (15) overlap or an end of the spindle nut (34) facing towards the riveting tool (10) is in front of an end of the spring element (15) facing towards the riveting tool (10).

16. A blind rivet setting system (100), comprising:

the riveting device (1) according to claim 15; and a rivet mandrel (120) of a blind rivet (110) to be set, wherein the rivet mandrel is received in the mandrel holder (12) of the riveting device (1).

17. A blind rivet nut setting system (200), comprising:

a riveting device (1) according to claim 15; and a threaded rivet mandrel (220) for a blind rivet nut (210) to be set, wherein the threaded rivet mandrel is received in the mandrel holder (12) of the riveting device (1).

18. A blind rivet screw setting system (300), comprising:

a riveting device (1) according to claim 15; and a threaded rivet mandrel (320) of a blind rivet screw (310) to be set, wherein the threaded rivet mandrel is received in the mandrel holder (12) of the riveting device (1).

* * * * *